United States Patent
Ronström et al.

(10) Patent No.: US 6,189,017 B1
(45) Date of Patent: Feb. 13, 2001

(54) METHOD TO BE USED WITH A DISTRIBUTED DATA BASE, AND A SYSTEM ADAPTED TO WORK ACCORDING TO THE METHOD

(75) Inventors: Ulf Mikael Ronström, Hägersten; Shahid Mahmood Malik, Tumba, both of (SE)

(73) Assignee: Telefonaktiebolaget LM Ericsson (SE)

( * ) Notice: Under 35 U.S.C. 154(b), the term of this patent shall be extended for 0 days.

(21) Appl. No.: 09/084,507

(22) Filed: May 27, 1998

(30) Foreign Application Priority Data

May 28, 1997 (SE) .................................................. 9702015

(51) Int. Cl.[7] .................................................. G06F 17/30
(52) U.S. Cl. .............................................. 707/204; 707/10
(58) Field of Search ............................. 707/10, 103, 202, 707/203, 204

(56) References Cited

U.S. PATENT DOCUMENTS

| | | | |
|---|---|---|---|
| 5,404,508 | | 4/1995 | Konrad et al. . |
| 5,423,037 | * | 6/1995 | Hasshovd ............................. 707/202 |
| 5,555,404 | * | 9/1996 | Torbjornsen et al. ............... 707/204 |
| 5,586,310 | * | 12/1996 | Sharman ............................. 707/204 |
| 5,740,348 | * | 4/1998 | Cunliffe et al. ........................ 707/10 |
| 5,761,500 | * | 6/1998 | Gallant et al. ........................ 707/10 |
| 5,815,649 | * | 9/1998 | Utter et al. ...................... 395/112.04 |
| 5,819,272 | * | 10/1998 | Benson ............................... 707/202 |
| 5,832,225 | * | 11/1998 | Hacherl et al. ................. 395/200.53 |
| 5,864,854 | * | 1/1999 | Boyle .................................... 707/10 |
| 5,893,115 | * | 4/1999 | Lewis .................................. 707/201 |
| 5,946,689 | * | 8/1999 | Yanaka et al. ........................ 707/10 |
| 5,970,488 | * | 10/1999 | Crowe et al. ........................... 707/8 |
| 6,014,667 | * | 1/2000 | Jenkins et al. ........................ 707/10 |
| 6,049,809 | * | 4/2000 | Raman et al. ....................... 707/203 |
| 8,012,059 | * | 1/2000 | Niemat et al. .......................... 707/8 |

* cited by examiner

Primary Examiner—Thomas G. Black
Assistant Examiner—Frantz Coby
(74) Attorney, Agent, or Firm—Burns Doane Swecker & Mathis LLP

(57) ABSTRACT

The present invention relates to a method to of ensuring the reliability of a system distributed data base, comprising several computers which together form nodes (1, 2, 3, 4) wherein information belonging to the distributed data base is storable. A fragment comprises a part of the data base and includes a primary replica (11) of the part and a secondary replica (21) of the part. The primary replica (11) is stored within a first node (1) and the secondary replica (21) is stored within a second node (2), separated from the first node (1). Both data information and log information are stored within both the primary replica (11) and the secondary replica (21). The secondary replica (21) is updated when the primary replica (11) changes (A) and is used to re-create a primary replica should the first node (1) crash. Respective fragment also comprise a stand-by replica (31) of the part, which is stored in a third node (3) that is separate from the first (1) and the second (2) node. This stand-by replica (31) is updated when there is a change in the primary and secondary replicas. The stand-by replica (31) comprises only log information.

19 Claims, 1 Drawing Sheet

METHOD TO BE USED WITH A DISTRIBUTED DATA BASE, AND A SYSTEM ADAPTED TO WORK ACCORDING TO THE METHOD

TECHNICAL FIELD

The present invention relates to a method of producing back-up replicas or safety replicas of data in nodes belonging to a distributed data base, and of structuring a system of such nodes, to provide a reliable system with a theoretically very small and practically non existent risk of a total failure or crash of the system.

A data base may be distributed in a system comprising several computers which computers in mutual coaction form nodes on which information belonging to the distributed data base can be stored.

A fragment comprises a part of the data base, and includes a primary replica of the part and a secondary replica of the part. The primary replica is stored within a first node and the secondary replica is stored within a second node that is separated from the first node.

Respective nodes in the system includes one or more primary and/or secondary replicas of different fragments.

Some transactions within the data base result in a change in one or more fragments. These transactions are so called changing transactions. Such changes are performed in the primary replica and the secondary replica is updated according to the change as a part of the changing transaction.

Both data information and log information is stored within both the primary replica and the secondary replica.

If the first node crashes then the primary replica is re-created from information available in the secondary replica.

PRIOR ART RELATED TO THE INVENTION

It is previously known to use back-up copying or safety copying in various computer systems in order to get parallel redundant systems, such as a primary system and a secondary system. It is also know that that the loss of data in relation to a crash of the primary system depends of how often the secondary system is updated.

Everything that has been performed during the time between a crash of the primary system and the latest update of the secondary system is lost when the primary system crashes.

In data base applications it is known that several operators or users can make use of the content of the data base through so called "transactions", where some transaction generates changes in the content of the data base, or changes in the structure of the data base, so called "schema changes".

In this context it is known store to two different kinds of information in both the primary and the secondary system.

A first kind of information is the actual content of the data base, which in this description is called "data information". A change in the content results in a change in both the primary and the secondary data base.

Further information that is stored relates to the transactions and to the schema changes that have been performed. This information is called "log information" and is stored within a so called "log". The log information of transactions and schema changes is also stored in a primary and secondary fashion.

A distributed data base comprises several nodes which together constitute a mutual system with a mutual data base.

The information within a distributed data base is distributed over the various nodes belonging to the data base.

One node can hold a primary replica of one or several parts of the data base and a secondary replica of one or several parts of the data base. A primary replica and an associated secondary replica is called here a fragment.

As examples of publications describing back-up copying in systems concerning distributed data bases the following publications can be mentioned: U.S. Pat. No. 5,404,508 and U.S. Pat. No. 5,555,404.

The present invention can be regarded as being based on a data base described in publication U.S. Pat. No. 5,423,037.

This publication describes a data base built upon a so called "shared nothing" system, meaning that every node within the system is completely independent from the other nodes and shares nothing that has anything to do with managing data, such as processors, memories or other data structures.

The publication teaches specifically that no memories can be shared between the different nodes.

The nodes are divided into at least two groups, one first and one second group, where the nodes in the different groups does not share any parts, such as power supply units and cooling fans.

The data base is divided into fragments and each fragment comprises one primary replica and at least one stand-by replica, which is essentially a copy of the primary replica, meaning that it comprises essentially the same information as the primary replica. The primary replica and the stand-by replica are stored in nodes that belong to mutually different groups of nodes.

Several stand-by replicas can be used to obtain a greater system reliability and if that is done then each stand-by replica comprises essentially the same information as the primary replica and they are all stored in nodes that belong to mutually different groups of nodes.

The groups of nodes are preferably symmetrical sets of nodes on different sides of the system's "mirror dimension".

The records in the stand-by replicas are kept up to date by sending all log records produced by transactions from the node with the primary replica to the node with the corresponding stand-by replica. The serialized log records are read and the corresponding table records updated at the node of the stand-by replica as an ongoing activity.

It shall also be mentioned that it is previously known to use various transaction protocols as information is transferred from one node to another.

Usually so called one-safe transmissions or two-safe transmissions are used.

In a simplified manner it can be said that in a one-safe transmission the log information related to the transaction is transferred from a first node to a second node. This transfer is performed at a moment when capacity to do so is available at the first node, which might be up to a few seconds after the transaction has been requested.

The second node uses the received log information from the transaction to update both data end log information within itself.

A one-safe transmission provides short response times to the application that has requested the transaction. On the other hand it also means that that second node is not always updated and that some transactions might be lost should the first node crash.

Put simply both the first and the second node take a part in the actual transaction in a two-safe transmission.

A request to prepare is sent at the start of a transaction, which includes a query of asking whether a certain transaction can be performed. Affected nodes reply to the request with "yes" or "no". A yes means that the nodes commit themselves to carry out the transaction if a decision is made to do so. If all affected nodes reply with yes, then the transaction is performed whereas if any node replies no then the transaction is aborted.

The second node partakes as one of the affected nodes in a two-safe transmission, meaning that it has to reply to whether it can commit to perform the transaction or not. The second node is thus updated as a part of the actual transaction, if the transaction is performed, meaning that the second node is always updated.

A two-safe transmission provides greater reliability than a one-safe transmission, since the second node almost always contains the same information as the first node. On the other hand, in the case of two-safe transmission the time to respond to the application that has requested the transaction may be longer than in the case of a one-safe transmission. A two-safe transmission also requires the transmission of more messages between affected nodes, and thus a higher transmission capacity than what is required in a one-safe transmission.

There is nothing that prevents the use of both one-safe and two-safe transmissions within the same system for different transactions and/or applications.

When a node crashes, the information stored in replicas within that node will be lost. These replicas might be primary replicas of some fragments and secondary replicas of other fragments. The loss of a primary replica means that a new primary replica must be made or re-created in another node with the help of the information stored within the secondary replica. The data and log information can be used to re-create the crashed node, depending on how frequently the secondary node is updated.

If a node crashes, causing the loss of a primary replica of a fragment, and if the secondary replica of that fragment has not been updated within the last two or three seconds, then all transactions that have been performed during these seconds, and concerning this fragment, will be lost. The system is then inconsistent.

Even if a node only constitutes a very small part of the total system such, inconsistency might cause the need to restart the complete system in order to regain system consistency.

Different systems are vulnerable to inconsistencies in different ways, and the use of one-safe transmissions may suffice in some systems whereas other systems may require two-safe transmissions in order to gain sufficient reliability.

Distributed data bases used within telecommunication applications are very vulnerable to inconsistencies within the system and must therefore be very reliable.

In large systems with several fragments distributed over several nodes, it is more probable that both the primary and the secondary replica in some fragment will be lost if two or more nodes crash simultaneously or immediately after one another than in the case of small systems. This probability increases both with the number of fragments and with the number of nodes in the system. In large systems, such as distributed data bases used within telecommunications applications, this probability is significant to the reliability of the system.

The use of a primary node and a secondary node updated through two-safe transmissions will provide great reliability provided that only one of these nodes crashes. Two-safe transmissions are also very time-wise and transmission-wise very expensive, which if data packages are used means that these packages must be made very large in order to justify the costs. Large data packages also result in longer response times in addition to the long response times caused by the two-safe transmissions.

Through the publication "A Survey of Online Reorganisation in IBM Products and Research" by G. H. Sockut and B. R. Iyer, Bulletin of the Technical Committee on Data Engineering, June 1996, vol. 19, no. 2, it is known to let a fragment constitute one primary replica and one so called stand-by replica, in which only log information is stored through one-safe transmissions.

The use of both primary and secondary replicas is sometimes called a double system. If one part of one system is lost due to a crash of one or several nodes the system goes from a double system to a single system until every replica is recreated and until the crashed node is restarted. If one or more nodes crash in a single system then this usually results in a total crash of the entire system. The system is thus highly vulnerable during the time immediately after a node has crashed.

The restart of a crashed node can take up to ten minutes, meaning that a system might have to run as a single system for this period of time.

One way to lessen the vulnerability of a single system is to let all transactions be performed directly to the disc memories of a node, and not to the primary memories, which is the normal case. The access time of a disc memory is longer than the access time of a primary memory, wherefore this will extend all response times in the system and thereby reduce the system performance considerably.

Direct transactions to disc memories results in that all changes are stored even if a node should crash, which is not the case if a change is stored within a primary memory and not yet saved to the disc memory.

SUMMARY OF THE INVENTION

TECHNICAL PROBLEMS

Taking the prior art under consideration, as aforedescribed, and based on a data base which is distributed in a system comprising several computers which computers in a mutual coaction form nodes wherein information belonging to the distributed data base can be stored, where a fragment comprises a part of the data base, and includes a primary replica of the part and a secondary replica of the part, where the primary replica is stored within a first node and the secondary replica is stored within a second node that is separate from the first node, where both data information and log information are stored within both the primary replica and the secondary replica, a technical problem resides in providing high reliability of the system regarding availability when one or several nodes crash simultaneously or immediately after one another.

Another technical problem resides in maintaining a system operational even when both the primary and the secondary replica are lost due to a crash of one or several nodes simultaneously or immediately after one another.

If respective fragments includes a further replica of the part, which is stored within a third node separate from the first and second node, a technical problem resides in designing such a further replica so that updating of this replica will not require too much capacity, such as processing-, transmission-, and storage-capacity.

Another technical problem resides in providing the possibility of re-creating a primary replica after a crash of both the first and second node by means of the information available in a stand-by replica only comprising log information.

Another technical problem resides in providing an update routine of both a secondary replica and a stand-by replica in a time-wise effective manner.

Another technical problem resides in integrating such a routine with the transaction concerning the primary replica as much as possible.

Another technical problem is one of enabling the information to be stored in a replica as the replica is changed or updated in a time-wise effective manner both in a normal state of the system and in a single system state.

SOLUTION

In order to provide a solution to one or more of the previously described technical problems is the present invention based on a method to ensure the reliability of a distributed data base, which data base may be distributed in a system comprising several computers, which computers in a mutual coaction form nodes wherein information belonging to the distributed data base is storable.

A fragment comprises a part of the data base, and includes a primary replica of the part, a secondary replica of the part, and a stand-by replica of the part. The primary replica is stored within a first node, the secondary replica is stored within a second node that is separate from the first node, and the stand-by replica is stored within a third node that is separate from the first and second node.

Respective nodes in the system include one or more primary, secondary and/or stand-by replicas of different fragments.

Some transactions within the data base results in a change in one or several fragments. These transactions are so called changing transactions. Such changes are performed in the primary replica and the secondary and stand-by replica are updated according to the change.

Both data information and log information are stored within both the primary replica and the secondary replica.

If the first node crashes then the primary replica is re-created through information available at the secondary replica.

Respective nodes thus hold a number of primary, secondary and stand-by replicas belonging to different fragments.

From the starting point of such a method the present invention teaches specifically that, in order not to require to much capacity for the updating of the stand-by replica, the stand-by replica only comprises log information.

This log information can be used to re-create a primary replica should a first or second node crash, even though this might require more time than what would have been necessary if both the data information and the log information had been available in the third node.

The present invention presents three different ways of using the stand-by replica in the re-creation of a primary replica.

The primary replica can be re-created by using the log information in the stand-by replica together with the data information in the first node.

Alternatively, the primary replica can be re-created from the log information in the stand-by replica together with the data information in the second node.

In order to provide a third way of using the log information from a stand-by replica in the re-creation of a primary replica, the present invention teaches that that the data information belonging to the primary and/or secondary replica is stored on a disc which is shared with the third node. This enables the primary replica to be re-created from the log information in the stand-by replica together with the data information on the shared disc.

The present invention also relates to a system according to the aforegoing that is adapted to work in accordance with the inventive method, where respective fragments include a stand-by replica which is storable in a third node and which comprises only log information, and where respective node include a number of primary, secondary and stand-by replicas of different fragments.

The present invention teaches that, with the purpose of providing an effective update procedure of the various replicas, the updating procedure is a part of the changing transaction and that respective replicas are updated through a two-safe transmission.

The present invention also teaches a system where data information related to the primary replica is storable on a first data-disc belonging to the first node, where data information related to the secondary replica is storable on a second data-disc belonging to the second node, and where the first and/or second data-disc is directly accessible to the third node, for instance by being a shared disc with the third node.

With the intention of providing a time effective and safe storage of information as a replica is changed or updated, the present invention teaches that such storage of information is effected in a primary memory belonging to respective node, that the information is transferred to the disc memory in question at a suitable point in time, but that, if the system is in a single system state, the log information is stored directly on the disc memory in question.

ADVANTAGES

Those advantages that are primarily afforded by an inventive method and system reside in the possibilities of providing a system that is much more reliable than known systems of this nature.

The secondary replica provides a security with information that is continuously updated in every transaction. This replica is instantly available for re-creation of a lost primary replica, since both data and log information is available. The stand-by replica enables the system to be kept in a double system state even when one or more nodes have crashed, and the critical transition to a single system will occur much more seldomly than known systems of this nature.

In certain applications, such as in telecommunication applications, a system can comprise a very large number of nodes. If both the primary and the secondary replica of the same fragment is lost simultaneously then this fragment can be recreated through the stand-by replica, even though this may require some time to effect. With the present technology it takes from a few seconds to approximately two minutes to recreate a primary replica from the information that is available in a stand-by replica, depending on different circumstances. The rest of the system is still available during this time and can work but without access to the information stored within the lost fragment.

The increase in respective fragments incurred by a stand-by replica in accordance with the present invention is an inexpensive way of providing a more reliable system. It requires no great expense related to processors, while expenses related to storage space in memories can be disregarded.

The main characteristic features of a method according to the present invention are set forth in the characterizing clause of claim 1, and the main characteristic features of a system according to the present invention are set forth in the characterizing clause of claim 9.

BRIEF DESCRIPTION OF THE DRAWINGS

A method and a system having the features characteristic of the present invention will now be described in more detail by way of example with reference to the accompanying drawings, in which.

DESCRIPTION OF PROPOSED EMBODIMENTS

Figure 1:
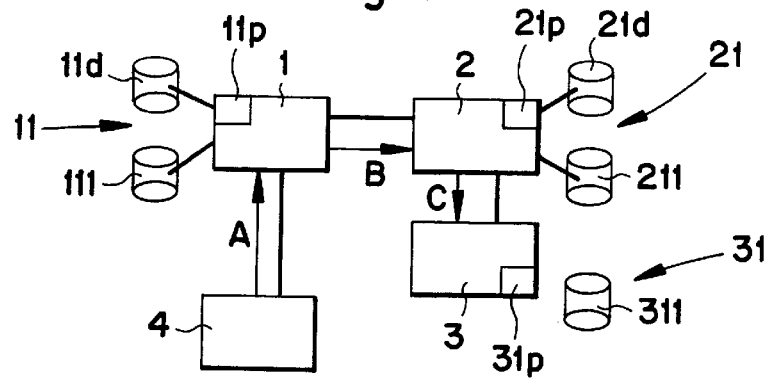
FIG. 1 is a schematic highly simplified illustration of a part of a system related to a distributed data base.

FIG. 1 illustrates schematically a part of a system related to a distributed data base, comprising several computers, which computers in a mutual coaction form nodes in which information belonging to the distributed data base can be stored. The figure shows some of these nodes/computers 1, 2, 3 and 4.

A fragment of a data base comprises a part of the data base, and includes a primary replica 11 of the part and a secondary replica 21 of the part.

The primary replica 11 is stored within a first node 1 and the secondary replica 21 is stored within a second node 2, separated from the first node 1.

Respective nodes comprise thus one or more primary and/or secondary replicas of different fragments. This spreads the risk of the loss of a complete fragment should one or more nodes crash. A node can crash due to the crash of a computer belonging to that node, or due to the crash of a disc memory where the required information is stored, or because of the unavailability of a node due to transmission problems etc.

Some transactions within the data base result in a change in the data base, and thus a change in one or more fragments. These transactions are so-called changing transactions. FIG. 1 shows how a node 4 requires a transaction A which causes a change in the primary replica 11. The transaction comprises an update procedure of the secondary replica 21, for example through a communication B between the first 1 and the second 2 node.

Both data information and log information are stored within both the primary replica 11 and the secondary replica 21. FIG. 1 shows that this information is stored on a data-disc 11d, 21d, and a log-disc 111, 211 belonging to respective node 1, 2. In practice, these discs can be formed by one single disc or, as shown in the figure, two separate discs. One and the same physical disc may form the data-disc for one fragment and the log-disc for another fragment.

FIG. 1 shows a first data-disc 11d and a first log-disc 111 belonging to the first node 1, and a second data-disc 21d and a second log-disc 211 belonging to the second node 2.

If the first node 1 crashes then the primary replica can be re-created through data and log information available in the secondary replica 21. The manner in which this is done belongs to prior art and this description will not be burdened with a detailed description of such measures.

Respective fragment also comprises a stand-by copy 31 of the part, which is stored within a third node 3, separated from the first 1 and second 2 node.

This means that respective nodes include one or several primary, secondary and/or stand-by replicas of different fragments. This is a further distribution of the risk of the loss of a complete fragment should one or several nodes crash simultaneously or immediately after one another. The probability of losing two out of three replicas, primary, secondary or stand-by, for any one fragment is relatively high should two or more nodes crash. The probability of losing all three replicas for any one fragment is much smaller. The reliability of the system is thus increased considerably by adding a stand-by replica to respective fragment.

The stand-by replica 31 can be updated when a change is made in the secondary replica 21 through a communication C between the second 2 and the third 3 node.

The present invention teaches specifically that the stand-by replica 31 only stores received log information without executing the same in order to minimize required storage space and processing capacity. This means that the stand-by replica 31 will not include any data information. The third node 3 is thus, according to FIG. 1, given a third log-disc 311.

This log information can be used to re-create a primary replica should either the first or second node 1, 2 crash.

This can be achieved by using the log information in the stand-by replica 31 together with the data information in the first node 1 or the second node 2 in re-creating the primary replica, as is most convenient when taking the availability of the data information in the first 1 or second 2 node into consideration.

In an alternative embodiment, the data-disc belonging to the primary 11 and/or secondary 21 replica is shared with the third node 3. This embodiment is illustrated in FIG. 2, where, as an example, the data-disc 21d' belonging to the secondary replica 21 is a shared disc that enables the primary replica to be re-created from the log information in the stand-by replica 31 and the data information in the shared data-disc 21d'.

The present invention teaches that, in order to make the updating procedure more effective, the communication between the first 1 and the second 2 node (B), and between the second 2 and the third 3 node (C), constitutes a part of the changing transaction A and that it is performed through two-safe transmissions, as illustrated with double headed arrows. This allows respective affected nodes 1, 2, 3 to partake in the decision as to whether the transaction shall be performed or not. This insures that every affected node 1, 2, 3 and every replica 11, 21, 31 within a fragment will be updated directly in relation to the changing transaction A.

A transaction that concerns several nodes in this manner is also called a distributed transaction. These transactions are previously known and will not be described in more detail here. A reference is nevertheless made a to a patent application with the title "Method for transaction within a distributed data base", with the SE application number 97 02014-3, where a transaction protocol which is specifically suitable for this kind of distributed transactions is described.

Figure 2:
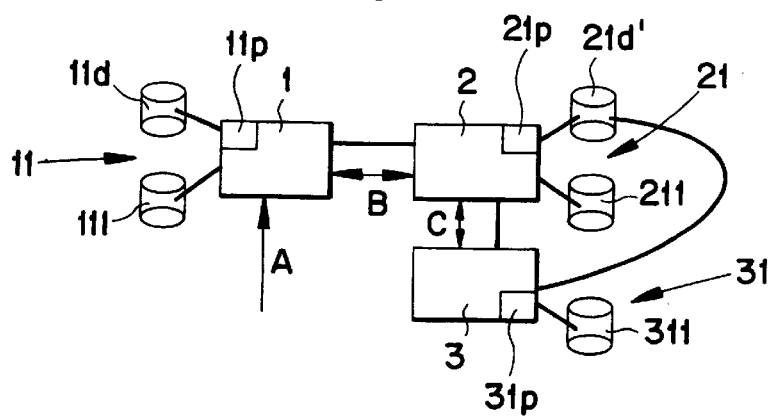
FIG. 2 is a schematic illustration of an alternative embodiment of a part of a system related to a distributed data base.

In the previous description, and according to FIGS. 1 and 2, the updating of the secondary and stand-by replicas is performed through a serial transmission of messages from the first node 1 to the second node 2 and so on to the third node 3, where the transaction originates from a node 4.

Figure 3:
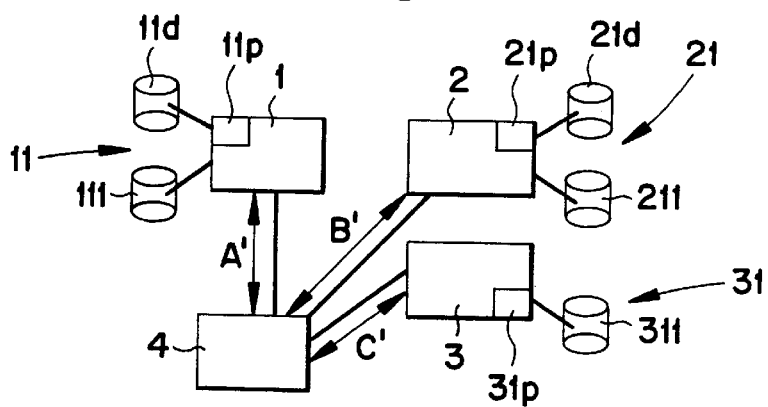
FIG. 3 is a schematic illustration of an alternative path for messages in relation to a distributed transaction.

There is nothing that prevents this updating procedure, which is a part of the transaction, from being commenced directly from the node 4, as shown in FIG. 3. This figure illustrates that the request A' for a transaction is sent to the first node 1, and that the transaction also includes an update message of the secondary replica 21 through a two-safe transmission B' from node 4 directly to the second node 2, and an update message of the stand-by replica 31 through a two-safe transmission C' from node 4 directly to the third node 3.

As a replica 11, 21, 31 is updated the information concerned is stored only in a primary memory 11p, 21p, 31p belonging to respective node 1, 2, 3 during the actual transaction. The transmission of log information from respective primary memory to disc memories is performed whenever suitable for respective nodes, such as when a primary memory buffer within respective primary memory is full, in order to optimize used disc capacity.

The present invention teaches a possible embodiment where the updating of respective replica is done directly to concerned disc memories 11d, 111, 21d, 211, 31d, 311 regardless of available memory space in respective primary memory 11p, 21p, 31p if the system is in a single system state.

The system will go into a single system state whenever a crash of a number of nodes causes only one replica within any fragment to be available, for instance the secondary replica 21 of a fragment. In this case the data information is stored directly on the data-disc 21d and the log information is stored directly on the log-disc 211 during the actual transaction.

This is done to eliminate the risk of losing information should the remaining node 2 also crash, in which case this information would have been lost if been stored solely in the primary memory 21p. It should be mentioned that storing directly to the disc memories 21d, 211 requires longer time than to store information in the primary memory 21p due to the access times of the disc memories.

It will be understood that the invention is not restricted to the aforedescribed and illustrated exemplifying embodiments thereof and that modifications can be made within the scope of the inventive concept as apparent from the following claims.

What is claimed is:

1. A method of ensuring the reliability of a distributed data base, that is distributed in a system, comprising; several computers which together form nodes wherein information belonging to said distributed data base can be stored, where a fragment comprises a part of said data base and includes a primary replica of said part, a secondary replica of said part, and a stand-by replica of said part, where said primary replica is stored within a first node, said secondary replica is stored within a second node that is separate from said first node, and said stand-by replica is stored within a third node that is separate from said first and said second nodes, where respective nodes include one or more primary, secondary and/or stand-by replicas of different fragments, where some transactions within the data base are changing transactions that result in changes in said fragment, which changes are performed in said primary replica, where said secondary replica and said stand-by replica are updated accordingly, where both data information and log information are stored within both said primary replica and said secondary replica, and where said secondary replica is used to re-create a primary replica should said first node crash, wherein said stand-by replica comprises only log information.

2. A method according to claim 1, wherein said log information is used to re-create a primary and/or a secondary replica should said first and/or said second node crash.

3. A method according to claim 2, wherein re-creation of said primary and/or secondary replicas is effected from said log information in said stand-by replica and from said data information in said primary replica.

4. A method according to claim 2, wherein re-creation of said primary and/or secondary replicas is effected from said log information in said stand-by replica and from said data information in said secondary replica.

5. A method according to claim 2, wherein said data information belonging to said primary and/or said secondary replica is stored on a shared disc with said third node, and that re-creation of said primary and/or secondary replicas is affected from said log information in said stand-by replica and from said data information in said shared disc.

6. A method according to claim 2, wherein the storage of information as a replica is changed or updated, is done in a primary memory belonging to respective node, and wherein said information is transferred from said primary memory to the disc memory in question at a suitable point in time, and when the system goes into a single system state, said information is stored directly to the disc memory in question.

7. A method according to claim 2, wherein said updating of said secondary replica and said stand-by replica constitutes a part of said changing transaction, and that said updating of said secondary replica and said stand-by replica is performed through a two-safe transmission.

8. A method according to claim 1, wherein said updating of said secondary replica and said stand-by replica constitutes a part of said changing transaction, and that said updating of said secondary replica and said stand-by replica is performed through a two-safe transmission.

9. A method according to claim 8, wherein re-creation of said primary and/or secondary replicas is effected from said log information in said stand-by replica and from said data information in said primary replica.

10. A method according to claim 8, wherein re-creation of said primary and/or secondary replicas is effected from said log information in said stand-by replica and from said data information in said secondary replica.

11. A method according to claim 8, wherein said data information belonging to said primary and/or said secondary replica is stored on a shared disc with said third node, and that re-creation of said primary and/or secondary replicas is affected from said log information in said stand-by replica and from said data information in said shared disc.

12. A method according to claim 8, wherein the storage of information as a replica is changed or updated, is done in a primary memory belonging to respective node, and where said information is transferred from said primary memory to the disc memory in question at a suitable point in time, and when the system goes into a single system state, said information is stored directly to the disc memory in question.

13. A system related to a distributed data base, comprising: several computers which together form nodes wherein information belonging to said distributed data base can be stored, where a fragment comprises a part of said data base and includes a primary replica of said part, a secondary replica of said part, and a stand-by replica of said part, where a first node is adapted to store said primary replica, a second node, separated from said first node, is adapted to store said secondary replica, and a third node, separated from said first and said second node, is adapted to store said stand-by replica, where respective nodes are adapted to comprise one or several primary, secondary and/or stand-by replicas of different fragments, where some transactions within the data base are changing transactions that result in changes in said fragment, which changes are performed in said primary replica, where said secondary replica and said stand-by replica are updated accordingly, where both data information and log information are stored within both said primary replica and said secondary replica, wherein said stand-by replica is adapted to comprise only log information.

14. A method according to claim 13, wherein said updating of said secondary replica and said stand-by replica constitutes a part of said changing transaction, and that said updating of said secondary replica and said stand-by replica is performed through a two-safe transmission.

15. A system according to claim 14, wherein a first data-disc belonging to said first node is adapted to store said data information belonging to said primary replica, and a second data-disc belonging to said second node is adapted to store said data information belonging to said secondary replica, and said first and/or said second data-disc is directly accessible to said third node.

16. A system according to claim 14, wherein a respective node is adapted to store relevant information as a replica and is changed or updated in a primary memory belonging to said respective node, and said respective node is adapted to transfer said information from said primary memory to the disc memory in question at a suitable point in time, such as when a primary memory buffer within respective primary memory is full, and said respective node is adapted to store said information directly to the disc memory in question when the system goes into a state of single system.

17. A system according to claim 13, wherein a respective node is adapted to store relevant information as a replica and is changed or updated in a primary memory belonging to said respective node, and said respective nodes are adapted to transfer said information from said primary memory to the disc memory in question at a suitable point in time, such as when a primary memory buffer within respective primary memory is full, and said respective nodes are adapted to store said information directly to the disc memory in question when the system goes into a state of single system.

18. A system according to claim 13, wherein a first data-disc belonging to said first node is adapted to store said data information belonging to said primary replica, and a second data-disc belonging to said second node is adapted to store said data information belonging to said secondary replica, and said first and/or said second data-disc is directly accessible to said third node.

19. A method of ensuring the reliability of a distributed data base, comprising the steps of:

storing information associated with said distributed data base at nodes, which are formed by at least two computers, wherein a fragment comprises a part of said data base and includes a primary replica, secondary replica and stand-by replica of said part;

storing said primary replica at a first node, a secondary replica at a second node and said stand-by replica at a third node, wherein said secondary replica is stored at a second node that is separate from said first node and said stand-by replica is stored at a third node that is separate from said first and second node, wherein respective nodes include one or more primary, secondary and stand-by replicas of different fragments;

changing said fragment based upon certain changing transactions in the data base;

updating said secondary replica and stand-by replica according to the changed fragment;

storing data information and log information within said primary replica and said secondary replica; and re-creating a primary replica, if said first node crashes, by using said secondary replica, wherein said stand-by replica comprises only log information.

* * * * *